United States Patent
Koelzer

(10) Patent No.: US 6,247,764 B1
(45) Date of Patent: Jun. 19, 2001

(54) FULL FUNCTION VALVE FOR HEAVY DUTY SEMI-TRAILER BRAKE SYSTEMS

(75) Inventor: Robert Koelzer, Kearney, MO (US)

(73) Assignee: Haldex Brake Corporation, Kansas City, MO (US)

( * ) Notice: Subject to any disclaimer, the term of this patent is extended or adjusted under 35 U.S.C. 154(b) by 0 days.

(21) Appl. No.: 09/296,849

(22) Filed: Apr. 22, 1999

(51) Int. Cl.[7] ....................................................... B60T 8/34
(52) U.S. Cl. ......................... 303/118.1; 303/7; 303/123; 303/127
(58) Field of Search ............................ 303/7, 118.1, 123, 303/127, 128, 8, 9, 68, 69, 71

(56) References Cited

U.S. PATENT DOCUMENTS

| | | |
|---|---|---|
| 5,100,208 * | 3/1992 | Angermair .......................... 303/118.1 |
| 5,118,169 * | 6/1992 | Moller ................................ 303/118.1 |
| 5,236,250 | 8/1993 | Moody et al. . |
| 5,240,271 | 8/1993 | Hart et al. . |
| 5,425,572 | 6/1995 | Koelzer et al. . |
| 5,458,403 | 10/1995 | Moody . |
| 5,466,053 * | 11/1995 | Koelzer ..................................... 303/7 |
| 5,511,860 | 4/1996 | Wallestad et al. . |
| 5,553,928 | 9/1996 | Hart et al. . |
| 5,577,814 * | 11/1996 | Engelbert et al. ................ 303/118.1 |
| 5,709,246 | 1/1998 | Koelzer . |
| 5,722,740 * | 3/1998 | Engelbert et al. ................ 303/118.1 |

* cited by examiner

Primary Examiner—Robert J. Oberleitner
Assistant Examiner—Mariano Sy
(74) Attorney, Agent, or Firm—St.Onge Steward Johnston & Reens LLC

(57) ABSTRACT

A full-function value for the tractor-trailer vehicle is provided with a unitary valve body enveloping service brake, pressure-protection, at least one solenoid, modulator and delivery pistons actuatable to be displaced between respective rest and operative positions within the body to provide a regular braking and ABS braking modes of the full function valve.

19 Claims, 8 Drawing Sheets

FULL FUNCTION VALVE FOR HEAVY DUTY SEMI-TRAILER BRAKE SYSTEMS

FIELD OF THE INVENTION

The present invention relates to a full-function brake valve for use in fluid pressure braking systems that are primarily employed on the semitrailers of heavy duty highway tractor-trailer vehicle combinations. More particularly, the invention relates to a full-function relay brake valve combining the functions of multiple separate brake valves to control the brakes of axles that are exempt from spring brakes on semi-trailers, including multiple axletrailers.

BACKGROUND OF THE INVENTION

The emergency and service requirements of modern heavy-duty highway tractor-trailer combinations meeting all of the pertinent governmental regulations that are applied to the trucking industry have necessitated installing a plurality of complex semi-trailer brake valve arrangements. The valve arrangements, which have been successfully designed to meet the requirements, are expensive and pose installation and maintenance problems. A system that is typical of the known valve arrangements includes a plurality of valves with multiple complex inter-connections, all designed to carry out multiple requisite brake functions.

One of the functions of the known multiple brake valve systems is a pressure protection valve that maintains pressure in the air supply line between the steering and at least one steerable axle in the event of failure of a pressurized air reservoir of the vehicle. This function is important because it is designed to prevent automatic application of spring brakes that are activated once the pressure in the air supply line drops below a predetermined low pressure.

A further function of the multiple brake systems relates to a check valve arrangement employed on the heavy-duty vehicles to block bleeding of pressurized air from the pressurized air reservoir through an air supply port.

Another function of the brake valve systems is to allow pressurized air from the air reservoir to be applied to the service brakes of the semi-trailers if the main air supply system has failed.

Still another function, which is critical to a modern tandem braking system, is the use of antilock brakes (ABS) during driving and braking operations of the semi-trailers. As known, ABS brakes increase safety by eliminating lockup and minimizing the danger of skidding, thereby allowing the semi-trailers to stop in a straight line. ABS brakes also allow the driver to maintain steering control during heavy braking so the vehicle can be driven to avoid an obstacle or another vehicle. Thus, ABS brakes optimize braking by monitoring the relative speed of the wheels to one another to module brake pressure as needed to control wheel slippage and maintain traction when the brakes are applied.

A tractor-trailer tandem braking system typically employs a multi-port relay valve to control the operation of the service brakes. The relay valve supplies pressurized air to, maintains pressurized air in, and releases pressurized air from the service brake chambers pursuant to control signals that are received from the tractor.

Manifestly, the various valve installations and interconnections accomplishing only partially the above-discussed functions on a multi-axle vehicle are complex, costly, difficult and inconvenient to install, troubleshoot, service, and maintain and otherwise are undesirable from a parts inventory standpoint. Previous efforts to integrate the various valve requirements within a single envelope or housing have not resulted in brake systems that could successfully meet current requirements. Moreover, a single housing enveloping ABS, regular service, and pressure protection valves has not been suggested by the known prior art.

SUMMARY OF THE INVENTION

It is therefore an object of the invention to provide a cost-sensitive and space-efficient tractor-trailer tandem brake system.

Still another object of the invention is to provide a full-function brake valve overcoming the drawbacks of the known prior art.

Yet another object of the invention is to provide within a single envelope an improved full-function brake valve for heavy-duty highway trailer vehicles which performs all of the required functions of the tandem brake system.

Another object of the present invention is to provide a full-function brake valve for heavy-duty trailer vehicles which meets all of the pertinent governmental requirements.

These objects are achieved by a full-function valve of the invention coping with the operating and safety requirements of modern semi-trailers. It meets the requirements of present pertinent Federal Regulations and does so by advantageously integrating various valve functions within a single space-saving and cost-saving envelope or housing, thereby eliminating a complexity of multiple valves and interconnecting lines. Essential to the inventive subject matter is a combination of check, pressure protection, modulator and delivery valves providing quick and reliable drive-away and braking.

The full-function valve according to the invention is formed with a unitary valve body comprising service brake, ABS/control and delivery units. A plurality of ports traversed by respective supply and control air includes service, supply, reservoir, control, delivery, and exhaust air ports. Supply and service ports are formed in a service brake unit, while the rest of the ports are provided in an ABS/control unit of the unitary body of the invention. A plurality of internal passageways within the valve body provides a pressurized fluid communication among the ports.

To differentiate pressurized air that fills the reservoir and actuates the service brakes from pressurized air that controls the relay valve module, the former is known in the art as supply or emergency air, and the latter as control or service air. Only the terms supply and control air are used in this text. Similarly, the respective ports which are provided in the service, ABS/control and reservoir units are referred to as the air supply ports and the air control ports.

The full-function valve of the invention provides a plurality of modes of the tandem brake system. An initial mode corresponding to an at-rest position of the brake system is characterized by the service port being closed. The whole brake system is under atmospheric pressure.

Upon starting the engine of the vehicle, the service unit receives pressurized supply air via a supply air line leading from and pressurized by a conventional compressor. As a result of increasing pressure, the service port opens while a reservoir passage closes, but not before the reservoir is filled up with supply air. The pressurization of the reservoir continues until the sufficient pressure is available at the reservoir to actuate the service brakes. Usually, the pressurized reservoir of the trailer or dally is filled out at the maximum of its capacity, typically, at most, 150 psig. This mode of the brake system corresponds to a cruising mode of the vehicle.

As known, a braking mode of the brake systems is initiated by depressing a brake pedal, which is connected to a conventional compressor commonly known in the art to provide delivery of control air through the supply port to the ABS/control unit. During braking, a modulator piston received in a main chamber is displaced in response to increase of control air pressure and, while moving, it engages and actuates a delivery piston. The delivery piston is so designed that during its displacement a passage providing flow communication between the reservoir and the delivery ports opens. A number of the delivery ports may vary, but according to the preferred embodiment of the invention, the brake system is equipped with four delivery ports.

Once a braking event is over, and the brake pedal is released to minimize the control air pressure upon the modulator piston, the spring-loaded delivery valve forces displacement of the delivery piston in a direction opposite to the initial direction. Pressurized control air escapes through the same passageway that provides delivery of control air to the modulator piston.

The full-function valve according to the invention provides an ABS braking mode during the above-described conventional braking mode. For this purpose, an ABS casing encloses a pair of solenoid-activated valves formed with respective pistons which are displaceable in response to signals received from a plurality of sensors detecting an ABS event.

According to the invention, the ABS casing is an integral part of the valve body. In case of an ABS event during the cruising mode of the vehicle, the antilock system responds by momentarily reducing pneumatic pressure to the brake on the affected wheel or wheels. The solenoid-activated valves responding to the above-described signals actuate displacement of the respective pistons, thereby providing continuous controllable escape of control air through an exhaust passage. Upon terminating the detected ABS event, brake pressure is reapplied to again slow the wheel or wheels. The cycle is repeated over and over until the vehicle stops or until the operator eases pressure on the brake pedal.

The full-function valve of the invention is provided with a spring-loaded protection valve enclosed in the valve body and reliably preventing bleeding of the supply pressurized air from the reservoir through the supply port during charging of the reservoir and during the driving mode of the vehicle.

Advantageously, if supply air unexpectedly exhausts, the pressure protection valve is designed to shuttle back and open the reservoir seat. As a result, reservoir air flows through the reservoir seat of the service parking unit to the emergency parking brakes and also directly on top of the main piston, eventually applying full reservoir pressure to the service brakes.

Many of the components of the tandem brake system according to the invention are generally known and commercially available. However, the gist of the present invention is the single valve body that houses a combination of the emergency parking valve, pressure protection valve and ABS valve and all of the internal passageways providing necessary fluid communication between the above-mentioned valves and ports.

Because most modern-day trailer brake systems employ pressurized air as the fluid medium for actuation and control purposes and such use is contemplated in the presently known best-mode embodiment described herein, the disclosure set forth assumes such medium to be used. An artisan will recognize, however, the invention is not necessarily limited hereto and the inventive concept may be adapted to other fluid medium.

BRIEF DESCRIPTION OF THE DRAWINGS

The above and other objects, features and advantages will become more readily apparent from the following specific description of the preferred embodiment of the invention, references being made to following drawings, in which.

Figure 1:
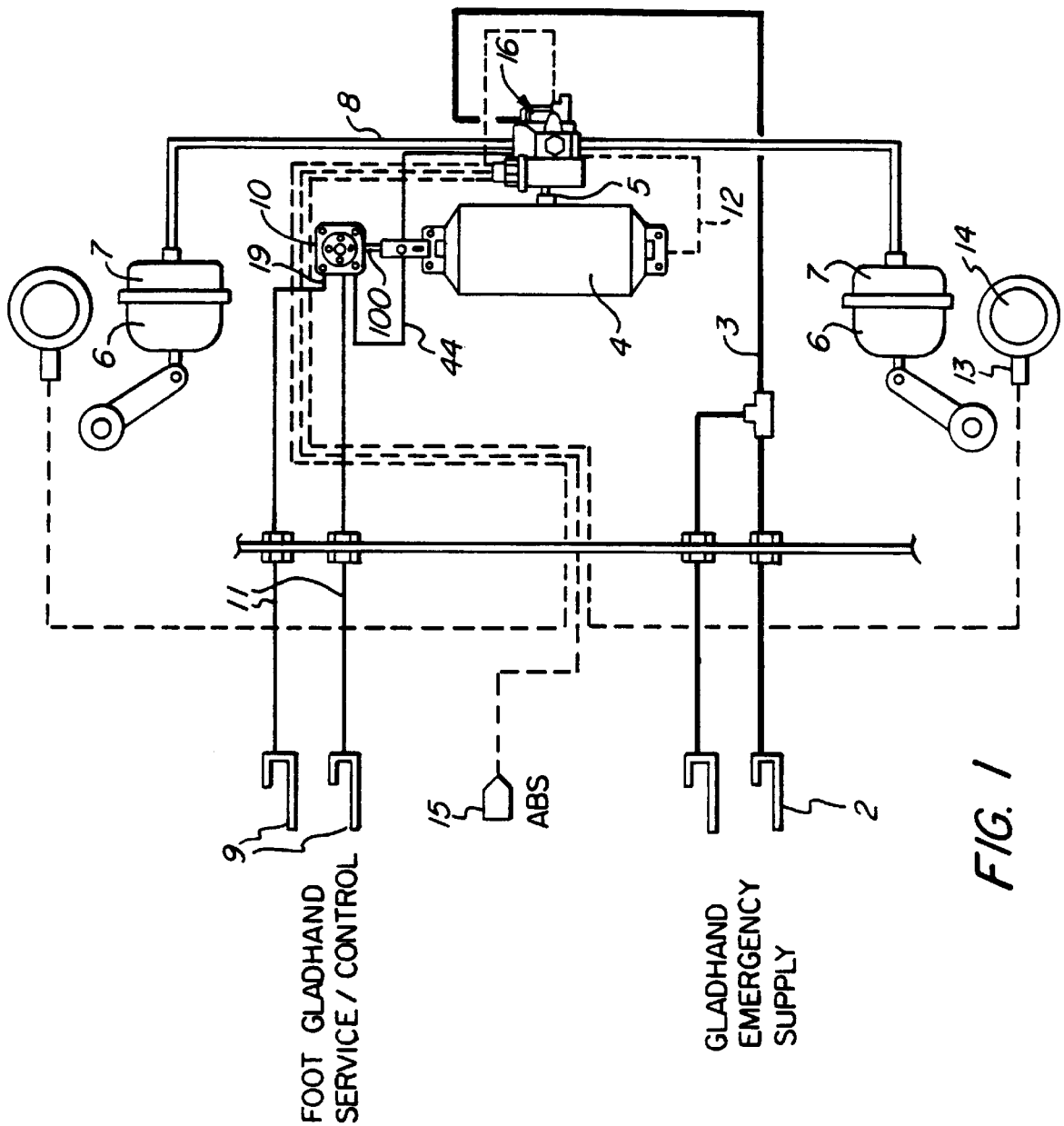
FIG. 1 is an overall schematic diagram of a semi-trailer tandem brake system wherein the full function valve of the invention is advantageously employed.

It should be understood that the drawings are not necessarily to exact scale and that certain aspects of the embodiments, particularly inner passages between multiplicity of ports and a reservoir, are illustrated by schematic representations and fragmentary views. It should be also understood when referring to physical relationships of components by terms such as "upper", "lower", upward", "downward", "vertical", "horizontal" left", "right", or the like, such terms usually have reference to the orientations depicted in the drawings. Actual embodiments or installations thereof may differ, depending upon the particular semi-trailer for which the braking system is designed. It is also should be clear that that the term "passageway" is not necessarily limited to a tubular path or other regularly-shaped passages but also encompasses fluid communicating spaces, chambers and the like.

DETAILED DESCRIPTION OF THE PREFERRED EMBODIMENT

Referring to FIG. 1, the schematic represents a semi-trailer tandem brake system including a full-function valve having a unitary valve body 1 (FIGS. 2–7) in accordance with the present invention. Pressurized supply air, typically at about 125 psig, is delivered into the system from a supply source (not shown) of the tractor-trailer combination via a trailer gladhand connector 2 and is communicated to the full-function valve 1 via a line 3.

Pressurized supply air is directed by the full-function valve to a reservoir tank 4 via a line 12. Pressurized air is also directed by the full-function valve to brake actuators 6, service brake chambers 7 thereof being in fluid communication with a full-function valve via lines 8 during a braking mode of the valve. Control air from the tractor actuating the service brakes is received via a gladhand 9 and is directed to a relay valve module 10 via lines 11.

Pressurized air that fills the reservoir and actuates the service brakes is referred to herein as "supply air", and pressurized air controlling the relay valve module 10 is defined herein as "control air". Control line 11 carrying pressurized control air delivers control air to a control or service air port 20 of an emergency parking control unit 17 shown in FIG. 3. The relay valve 10 is in fluid communication with the service brake valve 16 through a passageway 46, as shown in FIG. 1. Pressurized control air is regulated by a brake pedal (not shown herein) which is connected to a conventional compressor, commonly known in the art and not illustrated here.

The schematic also shows an ABS system including a plurality of sensors 13 monitoring the relative speed of the wheels to one another. In response to detecting an ABS event by sensors 13, exciters 14 operatively connected to a multi-way connector 15 actuate a modular ABS valve of the full function valve in a manner which will be fully explained below.

Referring to FIGS. 2–7, the unitary full-function valve of the tandem brake system of the invention is shown and discussed in detail with respect to several functional modes. In the following detailed description of the full-function valve in FIGS. 2–7, the same reference numerals are used so that the respective description can be more readily understood.

Figure 2:
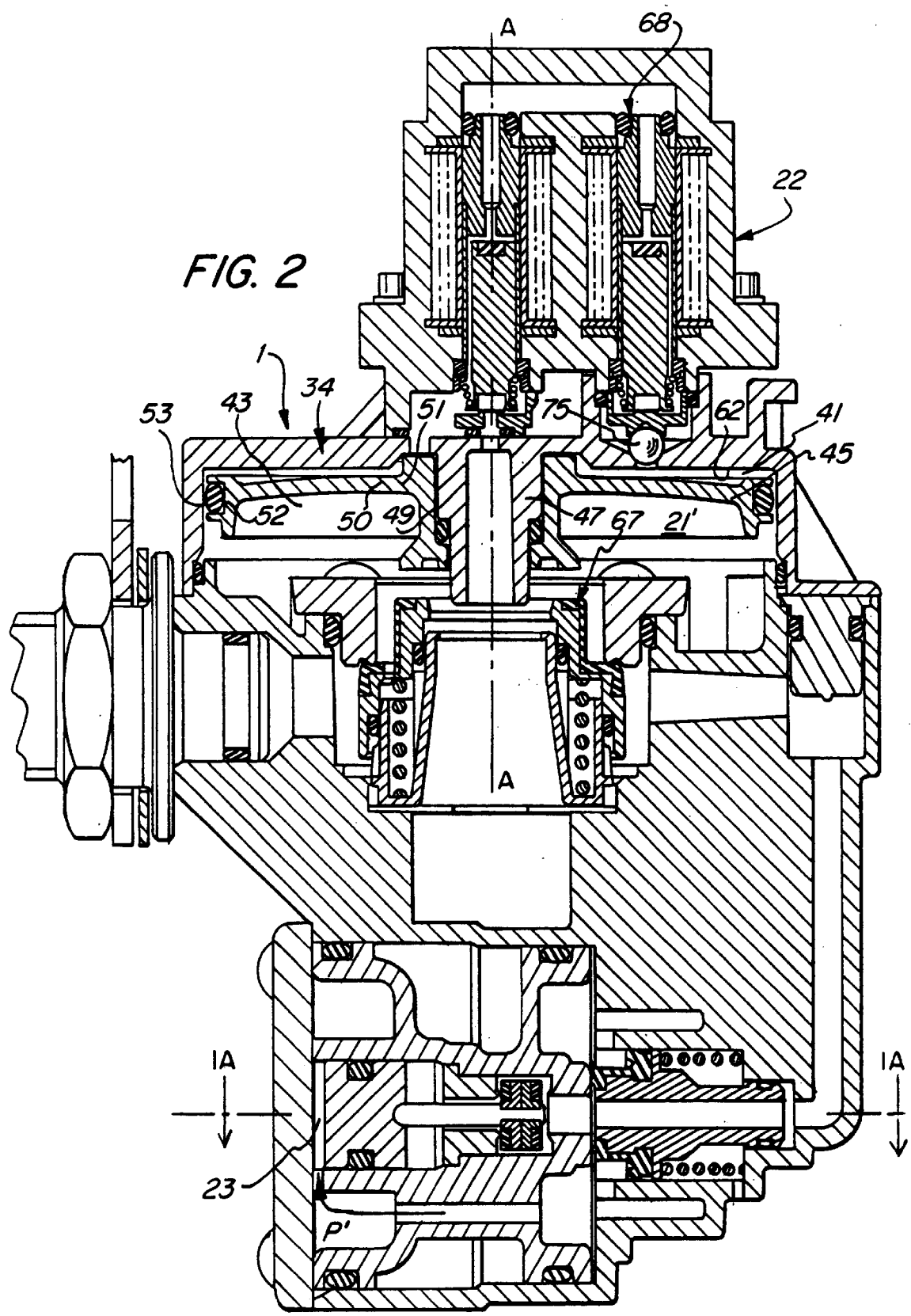
FIG. 2 is a cross-section view of the full-function valve of FIG. 1, showing the position of modulator, modulator, service and protection pistons during at-rest position of tandem brake system.
Figure 3:
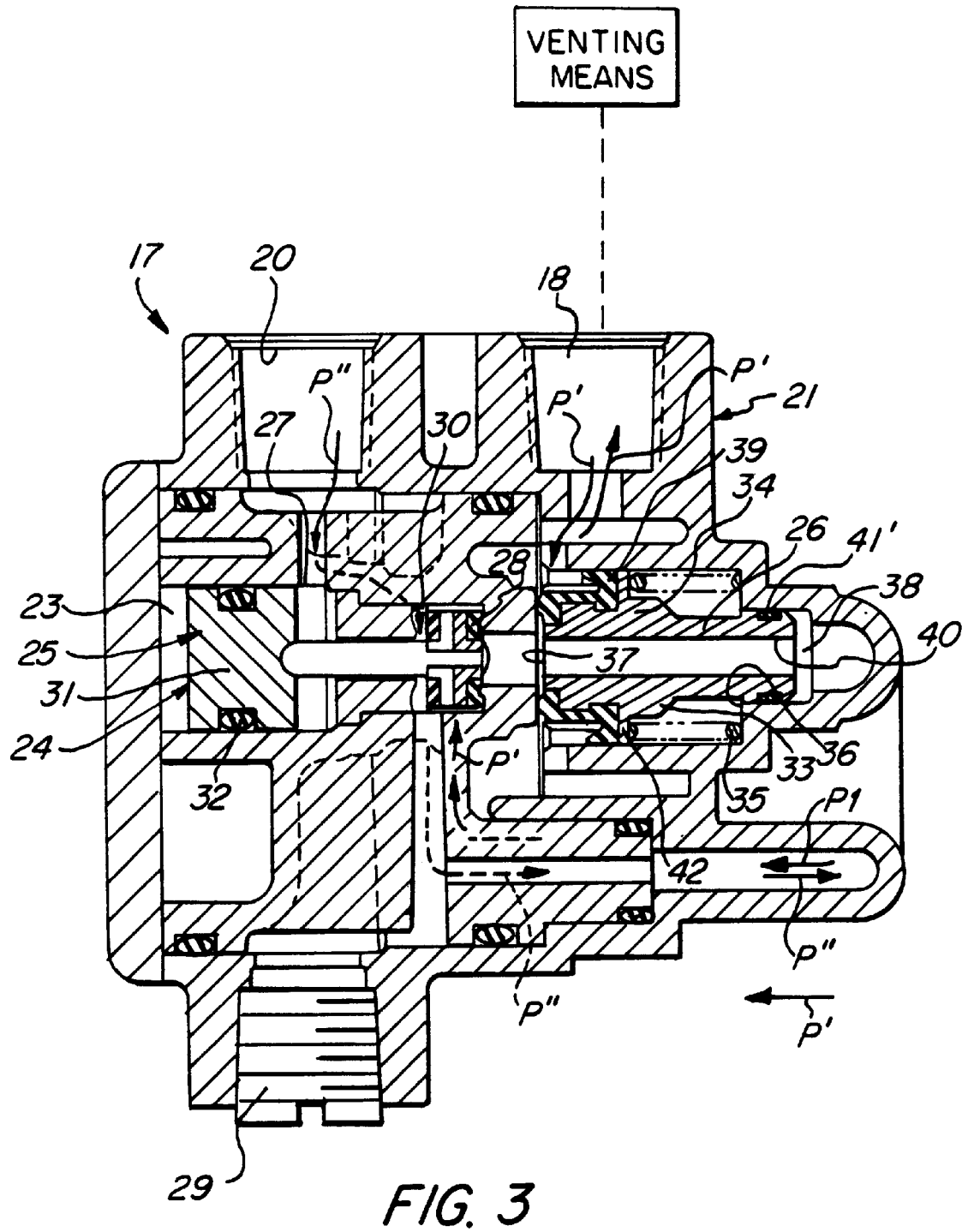
FIG. 3 is a cross-section view of an emergency parking unit of the fullfunction valve taken along lines 1A—1A shown in FIG. 2.

FIG. 3 illustrates a cross-sectional view of the emergency parking control unit 17 taken along 1A—1A, as shown in FIG. 2. The parking control unit 17 is formed integrally with the valve body 1 (FIGS. 2 and 4–8) and is connected between reservoir and control ports 18, 20 and the supply air lines 3 and 11 which deliver respective pressurized supply and control air, as seen in FIG. 1. The parking control unit includes a housing 21 provided with the above-mentioned supply and control ports 18 and 20 that are in fluid communication with respective outer supply sources via lines 3 and 11, as shown in FIG. 1. Upon engaging the trailer supply air valve, pressurized supply air traversing the supply port 18 fills a compartment 23 along a path P', as seen in FIGS. 3 and 2. The compartment 23 is a front part of a chamber 24 which is formed in a housing 21 of the emergency parking control unit 17. The chamber 24 receives a service parking valve 25 which is formed with a service piston 31 displaceable along a respective axis in response to a predetermined air pressure of supply air that traverses the supply port 18. During displacement from its left position, as shown in FIG. 2, the piston 31 which corresponds to a driving mode of a vehicle opens a service air seat 27 which is in fluid communication with the control air port 20. Simultaneously with opening of the service seat 27, the piston 31 moves in the chamber 24 to the right gradually closing a compartment 30 formed behind the piston 31. The compartments 30 and 23 are isolated from one another by an O-ring seal 32 received by an annular groove which is formed in a periphery of the piston 31. A stem carrying the service piston 31 has an enlargement which is spaced axially from the service piston 31 and upon closing of the chamber 30, seals off a reservoir seat 28, as shown in FIG. 3, thereby blocking a passageway leading from the air reservoir 4 to a service relay piston, not shown herein. The service relay piston 31 has preferably a cylindrical periphery. However, the piston may be of any other design readily understood by those skilled in the art without further amplification.

Initially, upon charging the brake system, the reservoir 4 is pressurized to enable the service brake capability. In order to realize it, the full-function valve according to the invention includes a spring-biased one-way pressure protection valve 26 formed with a protection piston 33 which extends along a respective axis that may extend parallel to the axis of the service parking piston 31. The protection piston 33 in a rest position thereof shown in FIG. 2, blocks the supply air port 18, thereby preventing flow communication between the supply air port 18 and the reservoir 4 along the passageway 12 (FIG. 1). Hence, the main function of the pressure protection valve is to prevent bleeding of pressurized supply air from the reservoir 4 through the supply port 18 in case of failure of a main air supply system of the tractor. The protection piston 33 is formed with an annular step-wise flange 34 which receives a spring 35. The opposite ends of the spring 35 may be embraced against an annular seat 36 of the housing 21 and the flange 34. During displacement of the protection piston 33 in a protection piston chamber, a front compartment 37 and a rear compartment 38 are formed and reliably isolated from one another by a Z-shaped annular seal 39 and by an O-ring 41' which is formed on a neck portion 40 of the protection piston 33. Under atmospheric pressure the spring 35 urges protection piston 33 to its rest position thereby blocking flow communication between the reservoir 4 and the supply port 18, as mentioned above. Upon building up a sufficient predetermined pressure in the front compartment 37 and overcoming the spring force exerted by the spring 35, the protection piston 33 moves to the right to allow flow communication between the supply port 18 and the reservoir 4 along the passageway 12. As a result of the step-wise peripheral surface of the protection piston, spring 35 extends axially in a space formed between the Z-shaped seal 39 and an annular seat 36 formed in the valve body 1. The piston 33 is formed with a radial flange 42 having a surface abutted by the seal 39. Typically, axial displacement of the protection piston occurs at a pressure above 70 psig. In case of failure of the main air supply system of the tractor, protection piston 33 is biased by the spring 35 in its rest initial position, thereby preventing supply air that has been accumulated in the reservoir 4 from escaping through the supply port 18.

Exhaustion of supply air in the main air supply system of the tractor causes displacement of the service and pressure protection pistons to its respective rest initial positions. The service piston 31 opens the reservoir seat 28 thereby unblocking the passage between the reservoir 4 and the service relay piston, as mentioned above in order to bring the valve assembly in an emergency braking mode of the service brakes using the pressurized air accumulated in the reservoir, as will be explained below.

FIG. 3 also shows a non-functioning sealing access port 29 for possible future embodiments. This port does not contribute to the functioning of the preferred embodiment of the invention and need not be discussed further.

As shown in FIG. 2 corresponding to a normal driving mode of the vehicle, the full function valve in addition to the chamber 24 of the housing 21 of the parking control unit 17, has a main piston chamber 43 which extends along an axis A—A in a housing 34 formed integrally with the valve body 1. As illustrated in FIG. 6 and mentioned above, the housing 34 has a control port 19 conveying control air through the passageway 44 between the parking unit 17 and the main piston chamber 43. Control air flowing from the control port 20 traverses the passageway 44 during the braking mode of the valve, as will be explained with respect to FIG. 5. During normal operation of the vehicle corresponding to atmospheric pressure in the tandem brake system as shown in FIG. 2, the modulator piston 45 of the relay control valve module 10 displaceable in the main chamber 43 is in its uppermost axial position.

Besides the modulator piston 45 the main piston chamber 43 receives a hollow stem 47 which may be formed integrally with the housing 34. The modulator piston 45 operates to connect the reservoir 4—or supply port 18 with delivery ports 55 (FIG. 6) upon shifting from its uppermost position (FIGS. 2, 4), which corresponds to the rest position of the brake system, to its lowermost position illustrated in FIGS. 5–8 and corresponding to the fully depressed brake pedal. Such displacement is a result of gradually increasing pressure of pressurized control air in a top compartment 41 which is formed between the modulator piston 45 and an inner surface 62 of the housing 34. The modulator piston 45 has generally a T cross-section formed with an elongated and axially extending hollow trunk 49 and an axially upwardly concave shoulder 50 which extends radially outwardly from the trunk 49. Shoulder 50 includes an inner annular flange 51 extending axially upwardly and an outer peripheral flange 52 extending in opposite axial directions from the shoulder and having a peripheral groove 53 which receives a seal pressed against a peripheral wall of the housing 34. The trunk 49 is formed with a bottom 54 having a radially inwardly extending annular surface which along with a radial shoulder 67 (better seen in FIG. 4) of the stem 47 forms an axial space 56 (FIG. 5) that receives a respective seal. As a result of the abovedescribed structure, the modulator piston has its outer and inner peripheral surfaces reliably sealed against respective peripheral walls of the housing 34 and stem 47.

It should be understood, however, that the modulator piston can take on any size and shape so long as it is responsive to control air for actuating a delivery valve 76 when pressurized control air is supplied through the port 19 from the supply port 20 of the emergency parking unit 17. Still another necessary requirement applied to the modulator piston is that it reliably isolates the top compartment 41 formed above the modulator piston 45 from a lower compartment 21' which is formed below the shoulder 50 of the modulator piston.

Figure 4:
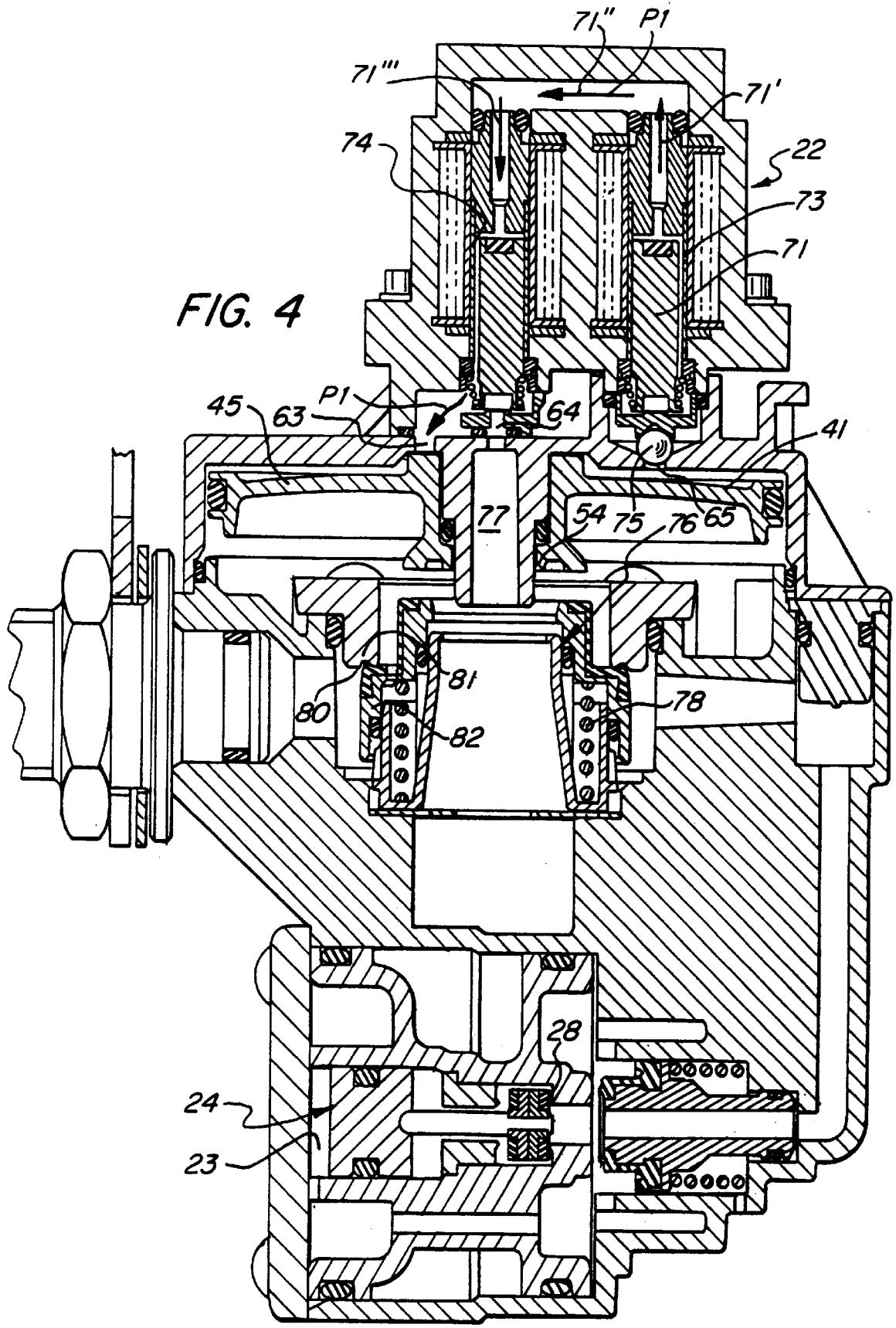
FIG. 4 is a cross-section view of the full-function valve of FIG. 1, showing the position of modulator, modulator, service and protection pistons during charging of a reservoir of the tandem brake system.

The inner surface 62 of the housing 34 is machined to have three angularly spaced passages 63, 64 and 65', as denoted in FIG. 4. The passage 64 is centered on the axis A—A and opens into the hollow stem 47; the passage 63 is blocked by the inner flange 51 of the modulator piston 45 in its uppermost rest position; and the passage 65' is blocked by a ball valve 75, as shown in FIGS. 2.

According to the invention, the valve body 1 also envelopes an ABS casing 22 housing a solenoid-activated brake relay valve 68. An energizer, commonly known in the art, energizes and deenergizes a pair of solenoids 70 (FIG. 4). When solenoids 70 are energized, armature 69 moves respective pistons 71 upwardly to provide an exhaust passage 72 between the top compartment 41 formed above the modulator piston 45, and an exhaust channel 77 of the stem 47 which is in flow communication with the passage 64 formed in the housing 34 (FIG. 4). The right solenoid is juxtaposed with the above-mentioned ball valve 75 and a passage leading into the ABS casing 22 to provide evacuation of control air out of the top compartment 41 upon releasing the brake pedal by the driver. As a result, the modulator piston moves upwardly. It is possible to have a brake system designed with only one solenoid. However, it is rather customary in the art to have a two-solenoid structure of the ABS brake.

Mounted in the main piston chamber 43 below the modulator piston 45 is the spring-biased delivery valve 76 which provides actual flow communication between the reservoir 4 and brake delivery ports 55 (shown in FIG. 6) upon downward displacement of the modulator piston 45. As shown in FIGS. 2 and 4, the delivery valve 76 is biased upwardly to a delivery-closed position under action of a spring 78. When the modulator piston 45 is in the lowermost position, the reservoir 4 is in maximum flow communication with the delivery port 55 and the full pressure is applied to the service brakes.

Figure 7:
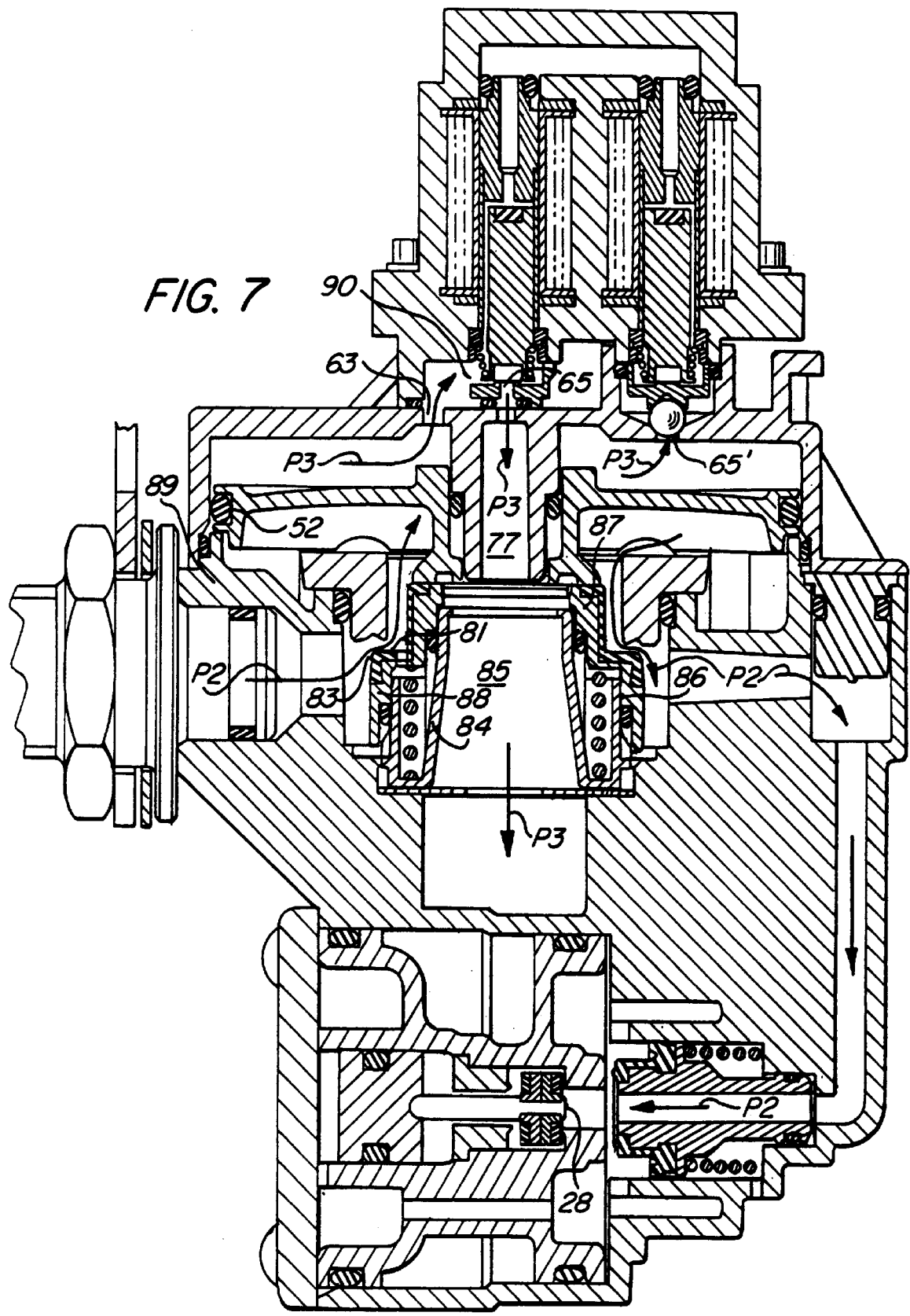
FIG. 7 is a cross-section view of the full-function valve of FIG. 1, showing the position of modulator, modulator, service and protection pistons during a final stage of braking.

Similar to all of the above-described valves, the delivery valve may have various shapes and forms, and the following description of the delivery valve is given purely as an example of the preferred embodiment. The housing 34 is formed with an annular L-shaped support (FIG. 4) having a contact surface 80 which presses against a surface 81 of a delivery piston 82 under normal conditions. Upon sufficient axial displacement of the modulator piston 45, the delivery piston 82 along with the surface 81 is removed from contact thereby opening a passage 83 (FIG. 7) which provides fluid communication between the reservoir 4 and the delivery ports 55. Axial displacement of the delivery piston is limited by the spring 78 braced against a hollow bell-shaped stop 84 which is formed with an outer axially extending flange 86 serving as a guide surface for the delivery piston 82. The stop 84 is further formed with an inner axial channel 85 communicating with the exhaust passage 77 of the modulator piston 45 (FIG. 7). The surface 81 of the delivery piston extends radially and bridges an axially extending neck portion 87 with an enlarged bottom portion 88 of the delivery valve.

FIG. 2 illustrates the full-function valve in the rest position of the tandem brake system which is under atmospheric pressure. Both service piston 31 and protection piston 33 are in its respective leftmost positions in which the service port 20 is blocked and the reservoir seat 28 is completely open. The rest position of the brake system corresponds to a driving mode of the vehicle. The modulator piston 45 is juxtaposed with the inner surface 62 of the housing 34. Due to concavity of the shoulder 50 of the modulator piston, the shoulder is spaced slightly axially from the inner surface thereby forming the top compartment 41 which during braking operations receives control air in order to actuate the modulator piston 45.

FIG. 4 illustrates the full-function valve in a position corresponding to starting of the engine of the vehicle. The supply air which is delivered through the supply port 18 of the parking service unit 17 into the chamber 24 thereof, generates pressure sufficient to displace the service piston 31 to the right. Such displacement is accompanied by gradual opening of the front compartment 23 which is in flow communication with the service port 20 and by closing of the reservoir seat 28, but not before the reservoir 4 is charged with the pressurized supply air via the passageway (FIG. 1). As mentioned before, the protection piston 26 is also displaced to the right position thereby overcoming the spring force of the spring 35. Thus, both pistons 31 and 33 are in the right position, while the modulator and delivery pistons are in respective uppermost positions. At this point the vehicle is ready for cruising.

Once the control port 20 is fully open, control air which is trapped in the ABS casing 22 escapes through the channel 44 and control port 20 which, at this time, is not under pressure.

Figure 5:
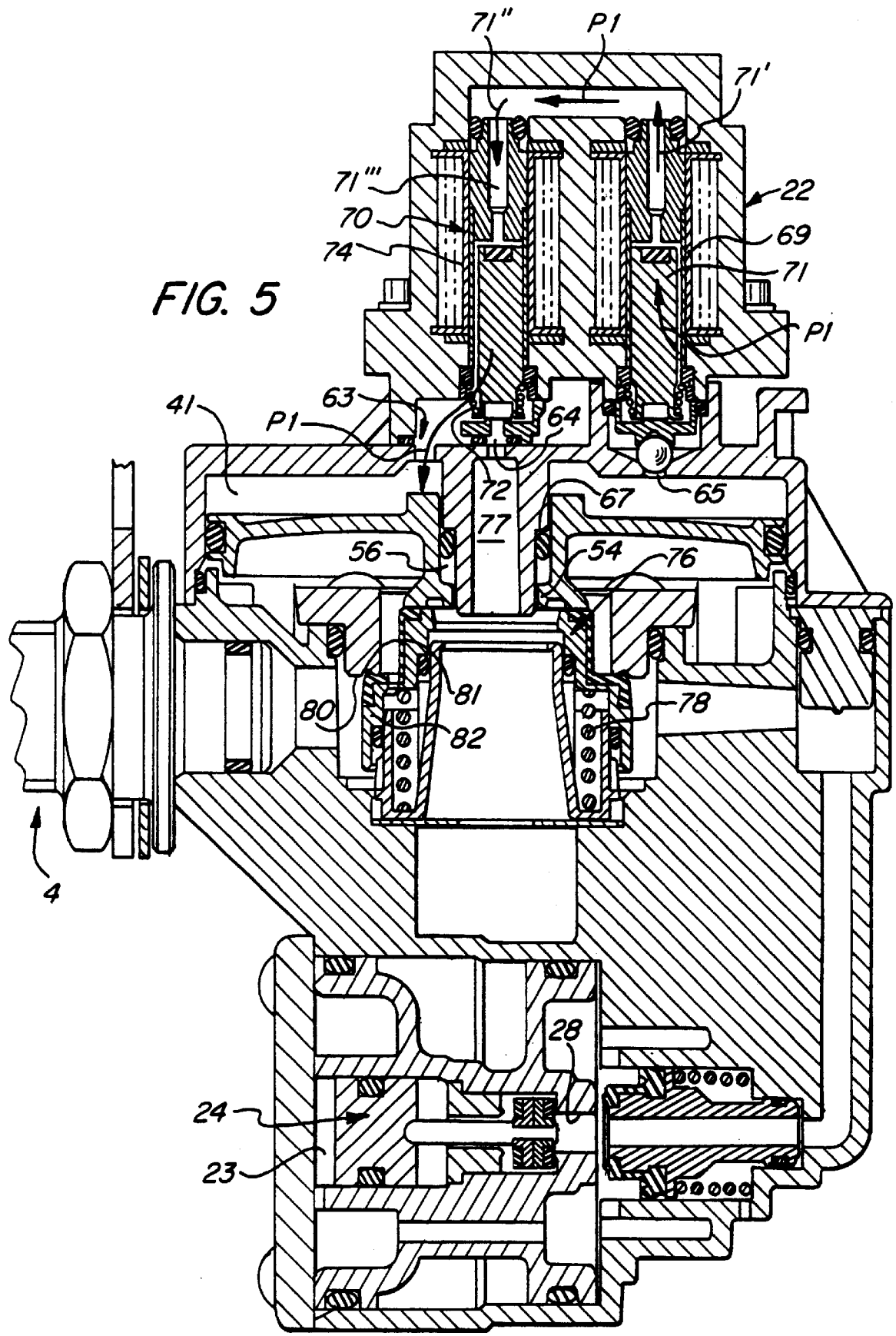
FIG. 5 is a cross-section view of the full-function valve of FIG. 1, showing the position of modulator, modulator, service and protection pistons during an initial stage of braking.
Figure 6:
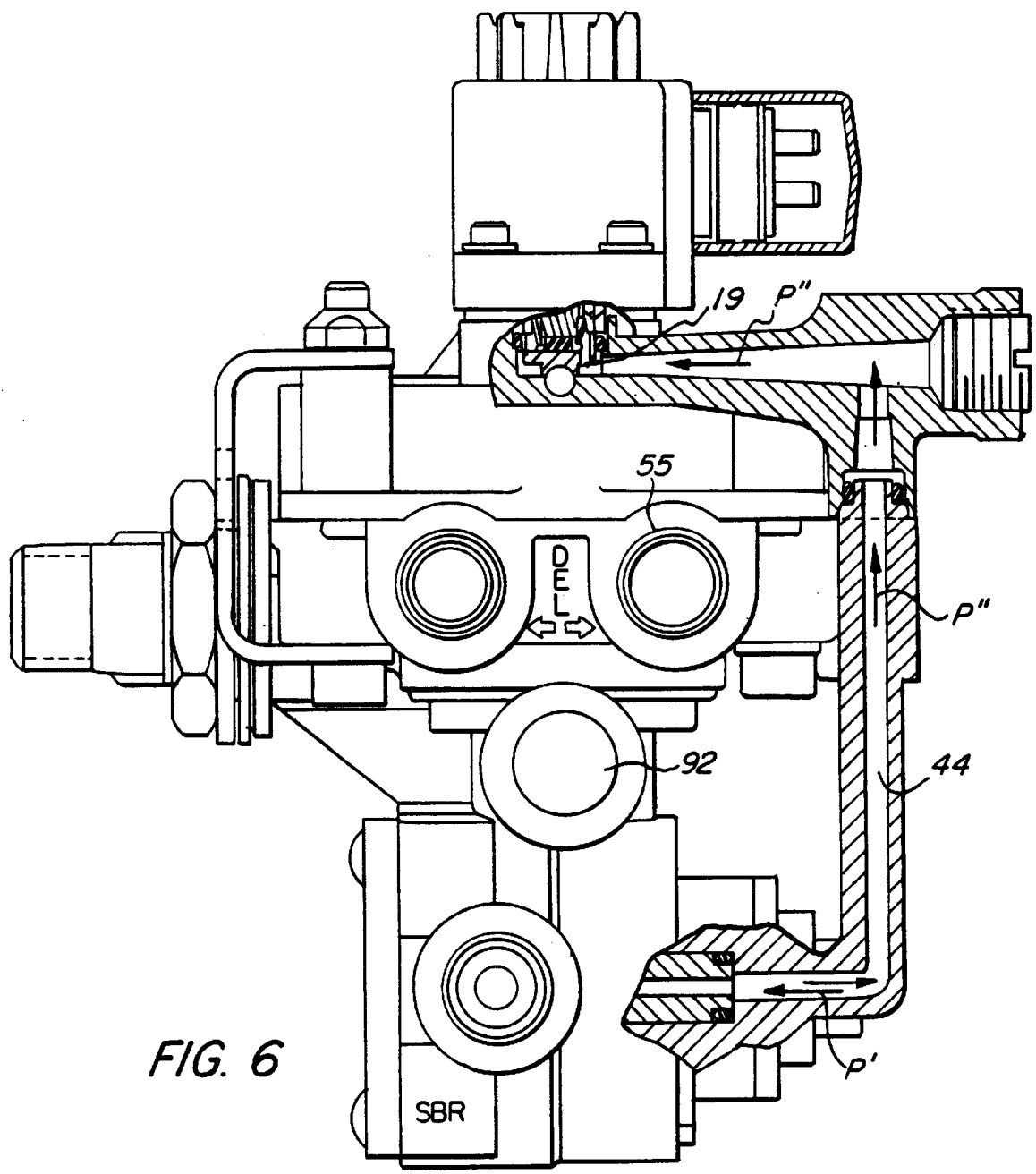
FIG. 6 is a partial cross-section view of a backside of the tandem brake system shown in FIG. 1.

FIG. 5 illustrates an initial stage of braking. Upon traversing the service port 20, control air is delivered to the port 19 (FIGS. 1 and 6) of the ABS casing 22 and is delivered to the passage 63 blocked initially by the inner flange 51 of the modulator piston 45. Following an air path P1 (FIG. 5), control air further enters a channel including an axial passage 73, which surrounds the right piston 71, hollow right stem 71', a transverse channel 71" hollow left stem 71''', an axial passage 74 which is formed along the left piston 71, and finally the passage 63 which is blocked by the inner flange 51 of the modulator piston 45. As the air flow rate increases, as it would during brake application, the modulator piston 45 will move axially downwardly upon reaching a predetermined pressure of control air, thereby increasing the volume of the top compartment. Control air traverses the passage 63 and expands all over the top compartment 41. The positions of the service piston 31, protection piston 33 and delivery valve 76 have not been changed.

Referring to FIG. 7, the modulator piston 45 is shown in its lowermost position. During downward displacement, the modulator piston engages the delivery valve which moves thereafter along with the modulator piston. This downward motion is accompanied by opening of the meeting surface 80 of an L-shaped support of the housing 34 and the surface 81 of the delivery piston, thereby forming a passage 83. As a result, supply air from reservoir 4 flows along a path P2 as shown by a plurality of arrows towards delivery ports 55. Axial displacement of the modulator and delivery pistons terminates upon reaching pressure equilibrium between the spring force, supply air pressure and control air pressure. In addition, housing 34 is provided with an annular flange 89 extending axially upwardly to meet a respective surface of the outer peripheral flange 52 of the modulator piston 45, thereby mechanically preventing further axial downward displacement of the modulator piston. The vehicle is in its braking mode.

The above described braking mode is conventional. However, if during conventional braking, sensors 13 (FIG. 1) detect an ABS event such as wheel lockup (and wheel spin during acceleration), the full-function valve operates in an ABS braking mode. The antilock system responds to signals generated by sensors 13 by selectively energizing/deenergizing solenoids 70 and axially displacing pistons 71. During upward displacement of the pistons 71, control air escapes along a path P3 through an exhaust channel formed by a plurality of passages which are in flow communication with one another. Particularly as shown in FIG. 7, the exhaust channel includes the passages 63 and 65, an opening 90 formed as a result of upward motion of the solenoid, the channel 77 of the stem 47 and the channel 85 of the delivery piston which is in flow communication with an exhaust port 92 shown in FIG. 6. The ball valve 75 preventing direct communication between the service port 20 and compartment 41 is unseated upon upward displacement of the modulator piston 45, thereby opening the passage 65 for quick release of control air along the path P3. Due to decrease of control air pressure in the top compartment 41, the modulator piston moves upwardly, thereby increasing volume under the shoulder 50 of the modulator piston while simultaneously decreasing control air pressure above the modulator piston to terminate the detected ABS event.

After termination of the ABS event, solenoids close almost immediately so as to facilitate the build-up of control air pressure in compartment 41. As know in the art, solenoids close in increments. After termination of an ABS event, braking continues in a usual manner.

Figure 8:
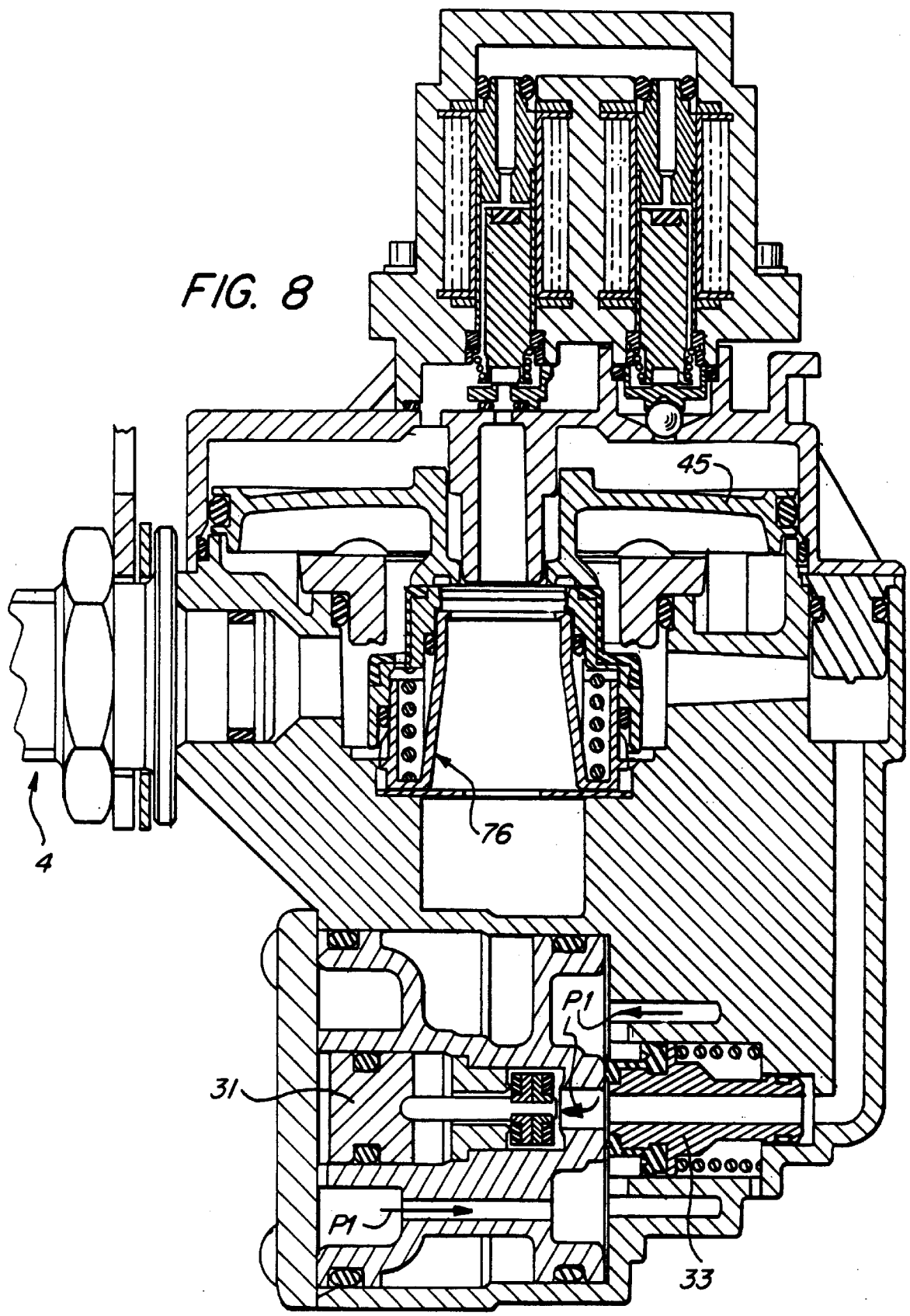
FIG. 8 is a cross-section view of the full-function valve of FIG. 1, showing the position of modulator, modulator, service and protection pistons during a final stage of braking in case of failure of the main supply system.

FIG. 8 illustrates the tandem brake system in a position corresponding to a failure of the supply system from the tractor during baking. The service parking and pressure protections pistons 31 and 33 are in their leftmost positions upon ventilating of the supply port to allow the trapped air out of the system, and, thus, ensuring that the service brakes are not under the excessive pressure. Upon displacement of the parking and protection pistons, supply pressure from the reservoir 4 is delivered to the top compartment above the modulator piston 45 through the passage 100 (FIG. 1) to initiate its downward displacement. During this displacement, the modulator piston engages the delivery valve 76 and the braking mode proceeds in the above-described manner. Thus the full pressure of reservoir supply air is applied to the service brakes.

Although the invention has been described with reference to a particular arrangement of parts, features and objects, these are not intended to exhaust all possible arrangements or features, and indeed many other modifications and variations will be ascertainable to those skilled in the art. It is to be understood any allowed claims based on this application are to be accorded a range of equivalence commensurate in scope with the advance made over the prior art.

What is claimed is:

1. A service brake system for a heavy-duty tractor-trailer vehicle, comprising:

a unitary valve body;

a control port formed in the body;

a supply port formed in the body;

a reservoir containing a pressurized air and having a reservoir port which is provided in the body in fluid communication with the supply port;

at least one delivery port formed in the body;

a service piston displaceable within the body between rest and operative positions thereof in response to a predetermined pressure of supply air traversing the supply port, the service piston opening the control port in the operative position;

a modulator piston reciprocally displaceable between respective rest and operative positions within the body in response to a predetermined pressure of control air traversing the control port;

a delivery piston biased to a respective rest position and movable by the modulator piston within the body to a respective operative position which corresponds to the operative position of the modulator piston, the delivery piston providing fluid communication between the reservoir port through delivery ports to actuate service brakes as the delivery piston is displaced from the rest position toward the respective operative position;

at least one ABS piston actuated upon detecting an ABS event experienced by the service brakes during displacement of the modulator and delivery pistons to the respective operative positions thereof, the ABS piston being movable reciprocally and operatively connected to the delivery piston to control fluid communication between the reservoir and delivery ports until the ABS event terminates; and a plurality of internal passageways within the valve body in fluid communication with the ports and disposed so as to affect reciprocal displacement of service, modulator and delivery pistons in response to a variable flow rate of control and supply air through the control and supply ports, said service piston being displaceable to the rest position upon venting of the supply port to allow full air pressure from the reservoir to be applied to the service brakes in the operative position of the modulator piston.

2. The brake system defined in claim 1, further comprising a spring-loaded pressure protection valve displaceable between respective rest and operative positions and closing off the supply port in the respective rest position, thereby preventing evacuation of pressurized supply air accumulated in a reservoir through the supply port upon exhaustion of supply air at the supply port.

3. The brake system defined in claim 1 wherein the valve body is provided with:
   a service chamber receiving the service piston and being in flow communication with the supply and control ports, and
   a main chamber receiving the modulator and delivery pistons and being in flow communication with the control and reservoir ports, the plurality of passageways including a channel extending between the main and service chambers.

4. The brake system defined in claim 1 wherein the delivery and modulator pistons are mounted coaxially in the main chamber.

5. The brake system defined in claim 1 wherein the modulator piston is formed with inner and outer flanges bridged by a shoulder and pressing sealably against an inner peripheral wall of the valve body and an outer peripheral surface of a hollow stem which is mounted coaxially with and surrounded by the inner flange of the modulator piston.

6. The brake system defined in claim 4 wherein the shoulder is concave and separates front and rear compartments formed in the main chamber upon displacement of the modulator piston, the front compartment being in flow communication with the control port and the rear compartment being in flow communication with the reservoir and delivery ports in the operative position of the service and delivery pistons.

7. The brake system defined in claim 3 wherein the service chamber is formed with a reservoir seat providing flow communication between the reservoir and a plurality of spring emergency brakes, the reservoir seat being blocked upon displacement of the service piston in the respective operative position thereof.

8. The brake system defined in claim 1 wherein the valve body further envelopes an ABS casing receiving the one and another ABS pistons, the one and other ABS pistons being solenoid pistons.

9. The brake system defined in claim 8 wherein the casing encloses a solenoid chamber traversed by control air flowing along a path between the control port and the main chamber and is provided with:
   an upstream chamber formed with the one solenoid piston and being in flow communication with the control port,
   a downstream chamber formed with the other solenoid piston, the one and other solenoid pistons being displaceable synchronously along respective parallel solenoid axes between normal extended position and exited positions in response to signals generated by a plurality of sensors detecting an ABS event,
   upstream and downstream axial channels formed between respective solenoid pistons and chambers, the axial channels being in flow communication with one another upon traversing the solenoid chamber by control air, and
   a transverse channel bridging the axial channels.

10. The brake system defined in claim 9 wherein the valve body enclosing the main chamber is formed with a cover juxtaposed with the ABS casing and is formed with first, second and third passages between the main and solenoid chambers, the third passage providing flow communication between the downstream axial channel formed in the respective downstream solenoid chamber and the main chamber upon displacement of the modulator piston from the respective rest position and upon displacement of the solenoid pistons in the exited position thereof in response to the ABS event.

11. The brake system defined in claim 10 wherein the hollow stem provided in the valve body is formed with an inner axial passage coaxial with and opening into the second passage formed in the cover to be in flow communication with the third passage and with the solenoid chamber upon displacement of the solenoid pistons in the exited position, thereby forming an exhaust passage traversed by control air and leading to an exhaust port which is formed in the valve body during the ABS event.

12. The brake system defined in claim 10 wherein the first and third passages are in flow communication with the main chamber, the third passage being blocked by the inner flange of the modulator piston in the rest position thereof, the first passage being blocked by a ball valve unseated upon displacement of the modulator piston from the respective operative position to the rest position.

13. The brake system defined in claim 1 wherein the delivery piston is formed with narrow front and wide rear axially extending potions bridged by a respective transverse portion, the front narrow portion being engaged by the inner flange of the modulator piston upon displacement thereof to the respective operative position,
   the valve body further including a support surface formed in the main chamber and having a respective stop surface, the stop surface being in contact with the transverse portion of the delivery piston in the rest position thereof and forming a channel therewith between the reservoir port and the delivery ports upon displacement of the delivery piston in the respective operative position.

14. The brake system defined in claim 13 wherein the valve body includes a stop surface spaced radially outwardly from the support surface and meeting the outer flange of the modulator piston in the respective operative position thereof.

15. The brake system defined in claim 14 wherein the valve body is further formed with a bell-shaped support surrounded by the delivery piston and formed with an annular flange extending toward the modulator piston and juxtaposed with the rear portion of the delivery piston and spaced from the front portion of the delivery piston.

16. The brake system defined in claim 15 wherein the delivery piston is provided with a spring braced against the annular flange and the narrow front portion of delivery piston.

17. The brake system defined in claim 2 wherein the spring-loaded pressure protection valve is formed with a protection piston, the protection piston having
   a narrow neck portion and a larger bottom portion, and
   an annular flange formed on the bottom portion and extending radially outwardly therefrom to form a first surface embraced by a spring and a opposite surface abutted by a Z-shaped seal extending along and surrounding the bottom portion.

18. A brake system for heavy-duty brake tractor-trailer vehicles, comprising:
   a unitary valve body formed with a plurality of individual ports including control and supply ports, a reservoir port in fluid communication with the supply port, and at least one delivery port;

a service piston displaceable within the body between rest and operative positions thereof in response to a predetermined pressure of supply air traversing the supply port, the service piston opening the control port in the operative position;

a modulator piston reciprocally displaceable within the body between respective rest and operative positions in response to a predetermined pressure of control air traversing the control port and operatively connected with the reservoir port to provide fluid communication between the reservoir and delivery ports to gradually actuate service brakes during displacement of the modulator piston toward the operative position;

at least one ABS piston movable reciprocally within the body upon detecting an ABS event during displacement of the modulator piston to the respective operative positions and being operatively connected therewith to affect displacement thereof for controlling fluid communication between the reservoir and delivery ports until the ABS event terminates; and a plurality of internal passageways within the valve body in fluid communication with the ports and disposed so as to affect reciprocal displacement of service and modulator pistons in response to a variable flow rate of control and supply air through the control and supply ports, said service piston being displaceable in the rest position upon venting of the supply port to allow full air pressure from the reservoir to be applied to the service brakes in the operative position of the modulator piston.

19. A brake system for a heavy-duty tractor-trailer vehicle, comprising:

a unitary valve body;

a control port formed in the body;

a supply port formed in the body;

a reservoir containing a pressurized air and having a reservoir port which is provided in the body in fluid communication with the supply port;

at least one delivery port formed in the body;

a service piston displaceable within the body between rest and operative positions thereof in response to a predetermined pressure of supply air traversing the supply port, the service piston opening the control port in the operative position;

a modulator piston reciprocally displaceable between respective rest and operative positions within the body in response to a predetermined pressure of control air traversing the control port;

a delivery piston movable by the modulator piston within the body between a rest position and an operative position, which corresponds to the operative position of the modulator piston, the delivery piston providing fluid communication between the reservoir port through delivery ports to actuate service brakes as the delivery piston is displaced from the rest position toward the respective operative position;

a spring surrounding the delivery piston and exerting a spring force which biases the delivery piston toward the rest position, said modulator piston overcoming the spring force to displace the delivery signal toward the operative position;

at least one ABS piston actuated upon detecting an ABS event experienced by the service brakes during displacement of the modulator and delivery pistons to the respective operative positions thereof, the ABS piston being movable reciprocally and operatively connected to the delivery piston to control fluid communication between the reservoir and delivery ports until the ABS event terminates; and a plurality of internal passageways within the valve body in fluid communication with the ports and disposed so as to affect reciprocal displacement of service, modulator and delivery pistons in response to a variable flow rate of control and supply air through the control and supply ports.

* * * * *